(12) United States Patent
Kennedy

(10) Patent No.: US 7,286,308 B2
(45) Date of Patent: Oct. 23, 2007

(54) LASER DIODE BAR BEAM REFORMATTING PRISM ARRAY

(75) Inventor: Chandler J. Kennedy, Town & Country, MO (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/202,300

(22) Filed: Aug. 11, 2005

(65) Prior Publication Data

US 2007/0035861 A1 Feb. 15, 2007

(51) Int. Cl.
*G02B 5/04* (2006.01)
*G02B 27/09* (2006.01)

(52) U.S. Cl. ........................ 359/836; 359/834
(58) Field of Classification Search ............ 359/619, 359/625, 627, 628, 834, 835, 836, 837
See application file for complete search history.

(56) References Cited

U.S. PATENT DOCUMENTS

| | | | | |
|---|---|---|---|---|
| 3,419,898 A | * | 12/1968 | Baldwin et al. ............ 356/508 |
| 5,168,401 A | * | 12/1992 | Endriz ....................... 359/619 |
| 5,513,201 A | * | 4/1996 | Yamaguchi et al. .......... 372/75 |
| 5,592,333 A | * | 1/1997 | Lewis ....................... 359/628 |
| 5,907,438 A | * | 5/1999 | Fujita et al. ................ 359/619 |
| 6,028,722 A | * | 2/2000 | Lang ......................... 359/834 |
| 6,044,096 A | * | 3/2000 | Wolak et al. ................. 372/36 |
| 6,115,185 A | * | 9/2000 | Du et al. .................... 359/628 |
| 6,377,410 B1 | * | 4/2002 | Wang et al. ................ 359/837 |
| 6,377,599 B1 | | 4/2002 | Marshall ..................... 372/75 |
| 6,556,352 B2 | * | 4/2003 | Wang et al. ................ 359/641 |
| 6,922,288 B2 | * | 7/2005 | Yamanaka et al. .......... 359/618 |
| 7,085,053 B2 | * | 8/2006 | Mikhailov .................. 359/497 |

FOREIGN PATENT DOCUMENTS

WO  WO 2004/023186 A1  3/2004

* cited by examiner

*Primary Examiner*—Ricky D. Shafer
(74) *Attorney, Agent, or Firm*—Nixon Peabody LLP

(57) ABSTRACT

Asymmetry of output beams from a laser diode bar is significantly reduced by internally reflecting the beams from an array of roof prisms positioned and oriented to rotate the cross-sectional shape of each beam by 90°. An elongated retro prism is positioned to received all of the reflected beams and to redirect them away from the laser diode bar.

8 Claims, 2 Drawing Sheets

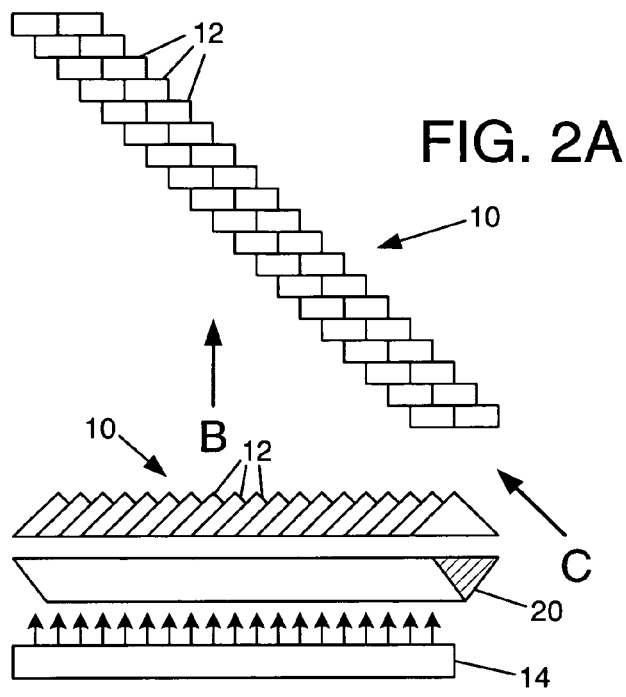
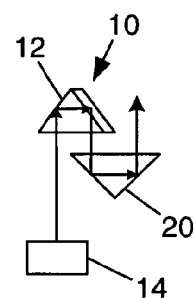
FIG. 2A
FIG. 2B          FIG. 2C
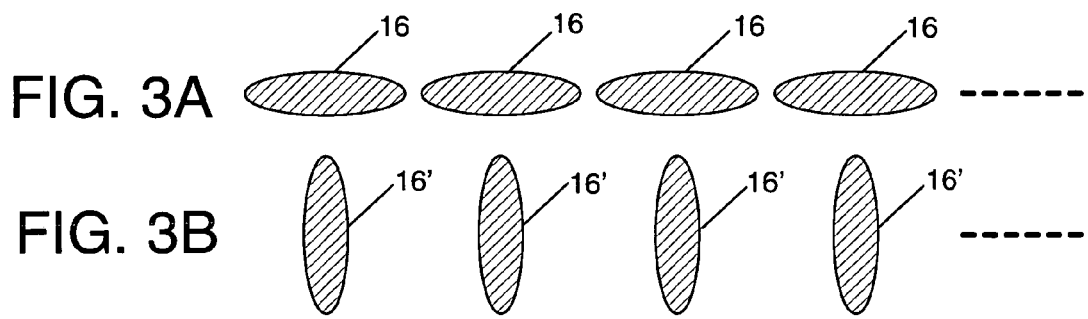
FIG. 3A
FIG. 3B

LASER DIODE BAR BEAM REFORMATTING PRISM ARRAY

BACKGROUND OF THE INVENTION

This invention relates generally to laser diode arrays and, more particularly, to high power laser diode arrays used for pumping fiber lasers. Optical fiber lasers are often employed as components in high power laser systems and, in a typical configuration of a fiber laser, an array of laser diodes is used for optically pumping the fiber laser. Such arrays are often referred to as laser diode bars.

A laser diode bar structure has a significant disadvantage in that light emitted from the structure consists of multiple relatively wide emitting stripes arrayed along a straight line. For example, each emitting segment may be approximately 1 µm×3.5 µm in cross section. A typical array may have an emitting surface with about nineteen or twenty segments, with an overall width of about 1.0 cm and with each segment only 1 µm in height. Therefore, the output beam from the laser diode array is highly asymmetrical. The raw, unfocused output beam is highly divergent and, even after focusing, the beam suffers from two related asymmetries: an elongated elliptical beam cross section, wider in a lateral direction across the width of the array than in a perpendicular transverse direction, and astigmatism, manifested in different divergence profiles for the lateral and transverse directions. These asymmetrical properties are highly undesirable for most applications, including supplying pump power to a fiber laser.

Various solutions have been proposed to address the asymmetry of output from a laser diode array, such as using twisted cylindrical lenses or multiply faceted mirrors, but all have potential disadvantages, such as having inherent energy losses or being difficult to manufacture.

One proposal in a paper by Peter Y. Wang, entitled "Beam-shaping optics delivers high-power beams," Laser Focus Magazine, December 2001, suggests the use of two sets of roof prisms, which together effect reshaping of the array output beam by using the first set of prisms to rotate each elemental diode output sub-beam by 90° and then using the second set of prisms to stack the sub-beams in a more symmetrical configuration as a composite output beam.

An international patent publication, identified by publication number WO 2004/023186 A1, entitled "An Apparatus for Converting Light Beams," filed in the name of inventor Yixuan Xiao, discloses using a plurality of parallel angled mirrors to shape sub-beams output from a linear array of light emitters.

Unfortunately, neither of these proposed solutions is completely satisfactory. The need for two sets of roof prisms as proposed in the Wang paper results in higher cost and potential alignment difficulties. The use of mirrors as proposed in the Xiao patent application potentially results in higher energy losses and manufacturing costs when compared with the use of prisms. Moreover, neither solution satisfies another important concern in the use of diode laser arrays in high-power applications. Each diode laser array must necessarily be cooled and, of course, supplied with electrical power. The need for cooling and electrical connections to the diode laser array means that the output light beam must be directed such that it does not interfere with the cooling and electrical connections.

Accordingly, there is still a need for an optical structure that reduces the asymmetry of an output beam from a laser diode array and avoids the drawbacks of the prior art. The present invention is directed to this end.

SUMMARY OF THE INVENTION

The present invention resides in an optical prism structure for reformatting output from a laser diode bar, which normally produces an linear array of output beams with cross-sectional shapes that are elongated in the same direction as the linear array. The prism structure of the invention comprises an array of optical roof prisms, each of the prisms having two opposed triangular faces, a hypotenuse face and two angled faces adjoining the hypotenuse face and adjoining each other to form a prism roof angle. The prisms in the array are positioned with common features arrayed along a selected axis, and are positioned with the triangular faces of adjacent prisms in overlapping contact. Each prism is offset from the closest adjacent prism by an offset distance equal to the thickness of each prism. This results in an array in which the roof line of each prism is oriented at 45° degrees to the selected axis. The array is positioned to receive light from a plurality of beams arrayed along the same selected axis and directed normal to the hypotenuse faces of the prisms. Each beam is internally reflected from a separate one of the prisms and, as a result of the orientation of the prisms, emerges with its cross-sectional shape rotated by 90°. The beam array is thereby reformatted to have more symmetric properties, which facilitate collimation of the array and launching into a fiber or other optical component.

Preferably, the optical prism structure further comprises an additional roof prism, having a length approximately co-extensive with the array of prisms measured along the selected axis, and positioned to receive light beams reflected from the array of prisms and to reflect the received beams as a set of parallel but oppositely directed beams. The additional roof prism directs the output light beams away from the laser diode bar, thereby avoiding any ancillary components needed for cooling and making electrical connections to the laser diodes.

It will be appreciated from the foregoing summary, that the invention provides a significant advance in the field of high power laser devices using laser diode bars. In particular, the invention provides a prism structure that reformats the output beams from a laser diode bar, to provide a desirable symmetric composite cross section for the beam array. The use of an additional roof prism directs the output beam array away from the laser diode bar and avoids interference between the output beams and laser diode bar ancillary equipment. Other aspects and advantages of the invention will become apparent from the following more detailed description, taken in conjunction with the accompanying drawings.

BRIEF DESCRIPTION OF THE DRAWINGS

FIG. 2A is a top plan view of the prism array structure of the invention;

FIG. 2B is an elevational view of the structure of FIG. 2A, as viewed in the direction of the arrow B;

FIG. 2C is an elevational of the structure of FIGS. 2A and 2B, as viewed in the direction of the arrow C.

FIG. 3A is a fragmentary diagrammatic view of the beam cross section before reformatting.

FIG. 3B is a figure similar to FIG. 3A but showing the beam cross section after reformatting in accordance with the invention.

DETAILED DESCRIPTION OF THE INVENTION

Figure 1:
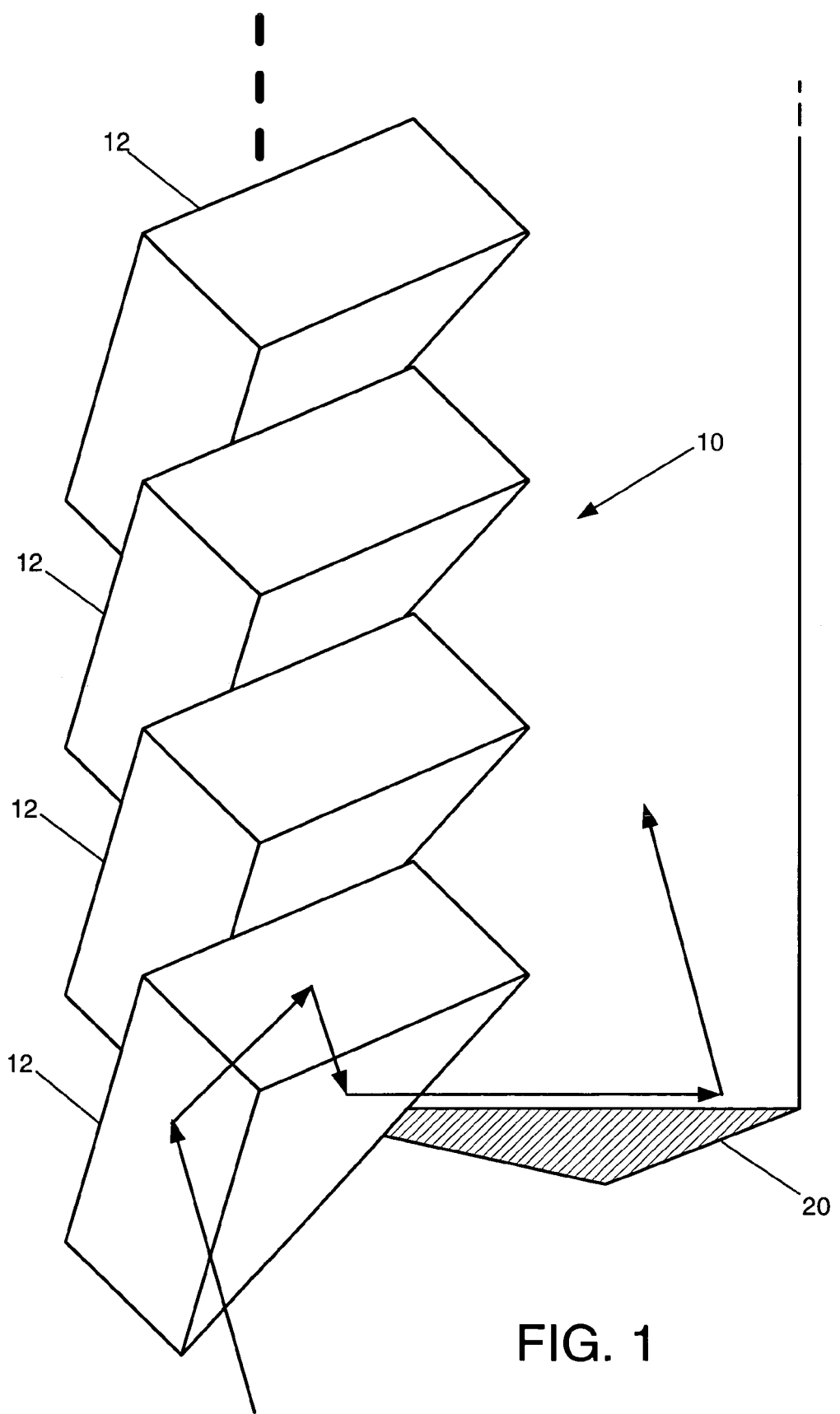
FIG. 1 is a fragmentary perspective view of four prisms of a prism array in accordance with the invention, shown in relation to a retro prism.

As shown in the drawings for purposes of illustration, the present invention pertains to a technique for reshaping or reformatting an output beam from a laser diode bar array of the type that may be used in high power applications, such as for pumping a fiber laser. A well known difficulty associated with laser diode bar arrays of wide stripe emitters is that the resultant output beam is elliptical in cross section and diverges differently in the transverse and lateral directions. The output beam is said to exhibit anamorphism, as often defined by the beam invariant, which is the product of the near field diameter (in millimeters) and the far field diameter (in milliradians). Ideally, the beam invariant in the transverse and lateral directions should be roughly the same, meaning that the beam exhibits low astigmatism and a high degree of circularity of cross section. In this context, the "lateral" direction extends across the emitter array, parallel to the linear array of emitter bars, and the "transverse" direction is perpendicular to the transverse direction, and perpendicular to the optical axis along which the beam is propagated.

Unfortunately, a typical laser diode bar having, for example 19 100-μm stripes has a transverse beam invariant of about 1 mm-mr and a lateral beam invariant of about 450 mm-mr. The principal object of the invention is provide a composite output beam that is more nearly circular in cross section and has more nearly equal invariants in the lateral and transverse directions. A typical optical fiber has beam acceptance criterion of about 44 mm-mr invariant, and it is, therefore, also an object of the invention to provide a composite output beam having transverse and lateral invariants both less than 44 mm-mr.

In accordance with the present invention, an array 10 of right-angle roof prisms 12 is positioned to intercept light from a diode bar 14, as indicated diagrammatically in FIGS. 1 and 2A-2C. Each sub-beam emitted from the diode bar 14 impinges on its own prism 12, which receives the sub-beam through and approximately normal to the hypotenuse face of the prism. The sub-beam is reflected from one angled face of the prism 12 to the other, and follows a return path out of the prism in a direction parallel to, but oppositely directed and offset from the original path of sub-beam from the diode bar 14. A critical aspect of the invention is that the roof prisms 12 are each rotated such that the roof lines of the prisms lie at 45° to the direction of orientation of the laser diode bar 14 (the lateral direction). Therefore, to align the prisms 12 with the sub-beams from the diode bar 14, each prism is offset from its nearest neighbors by a uniform offset distance in the lateral direction. The prisms are preferably stacked in contact with each other, as best shown in FIGS. 2A and 2B, to form a unitary array structure, although it is not a requirement that they be in contact with each other.

By way of further clarification of the geometry of the array 10 of prisms 12, the hypotenuse faces of the prisms are disposed in a single plane, as best seen in FIG. 2B, but because the prisms are oriented at 45° to the lateral direction on which the diode bar emitters are arrayed, each prism is offset with respect to its nearest neighbor in a direction that is parallel to the plane of the hypotenuse faces and parallel to the triangular faces of the prisms.

The effect on each sub-beam as it is internally reflected from two angled surfaces of the corresponding roof prism 12, is to rotate the cross-sectional shape of the beam by 90°. As the sub-beams enter the array 10, their cross sections 16 (FIG. 3A) are highly elongated in the lateral direction, but as the beams leave the array their cross sections 16' (FIG. 3B) are elongated in the transverse direction, which is to say that the sub-beam cross sections have their longer dimensions rendered parallel in the transverse direction, instead of being arranged "end-to-end" in the lateral direction. The originally very narrow dimension of the output array in the transverse direction is effectively increased by passage through the prism array 10, by a factor of approximately three to four, or more, depending on the width-to-height ratio of the original sub-beam cross section 16. This beam rotation has the effect of more nearly circularizing the composite beam cross section, after appropriate collimation, and greatly reduces the disparity between the invariant values in the lateral and transverse directions. For the illustrative 19-emitter array, the reformatted beam has a transverse beam invariant of 19 mm-mr and a lateral beam invariant of 25 mm-mr, values that are more nearly equal and permit launching of the beam into an optical fiber without significant losses.

As described to this point, the invention accomplishes the principal object of the invention and provides an output beam that is oppositely directed and slightly offset from the output beam from the laser diode bar 14. Unfortunately, this beam path may be inconveniently close to cooling and electrical connections to the laser diode bar 14. In accordance with another aspect of the invention, the reshaped output beam from the array 10 of prisms 12 is directed into a single roof prism 20 having its roof line generally parallel to lateral direction of the beam cross section. All of the sub-beams reflected from the prism array 10 enter the prism 20 through, and generally normal to, the hypotenuse face of the prism. The sub-beams are reflected from each of the two angled faces of the prism 20 in turn, and emerge in a direction parallel to the original direction of propagation from the laser diode bar 14, but offset a short distance from the original beam because of the offsets inherent in the prism array 10 and the prism 20. Thus, the prism 20 operates as a retro prism, reversing the direction of the composite output beam, but otherwise retaining its desirably improved symmetry. Use of the retro prism 20, therefore, avoids passing the output beam close to the laser diode bar 14 and its required cooling and electrical connections.

Since the output of the diode bar 14 is polarized, and since the total internal reflections in the prism array 10 lie in planes which have both components of polarization present, a relative phase shift between the polarization components will be induced in the array. It can be shown that if the index of refraction of the prism array 10 and the retro prism 20 are chosen properly, the output polarization will be linear and in a direction 45° from the line of the diode bar 14. This state of polarization is a convenient one for using for subsequent beam combining of bars through a polarization beam combiner (not shown).

The surfaces of the prisms 12 and the retro prism 20 are either anti-reflection (AR) coated (the hypotenuse faces, through which light is to be transmitted), or provide for total internal reflection (the internal angled faces of the prisms). Losses for this type of device are typically lower than for other types of optical components, such as cylindrical lenses or mirrored surfaces. Prisms are also relatively easy and less costly to manufacture than the other types of optical components.

It will be appreciated from the foregoing that the present invention represents a significant advance in the field of high power lasers. In particular, the invention provides a relatively symmetrical composite output beam from a linear laser diode array, permitting the output beam to be easily launched into an optical fiber or coupled to some other optical component. It will also be appreciated that, although a specific embodiment of the invention has been illustrated and described by way of example, various modifications may be made without departing from the spirit and scope of the invention. Accordingly, the invention should not be limited except as by the appended claims.

The invention claimed is:

1. An optical prism structure for reformatting an output from a laser diode bar, which produces a linear array of output beams, wherein the reformatting of the output effects an interchange of lateral and transverse beam properties, the prism structure comprising:

an array of optical roof prisms, each of the prisms in the array having two opposed triangular faces, a hypotenuse face and two angled faces adjoining the hypotenuse face and adjoining each other at a prism roof angle of approximately 90°;

wherein the prisms in the array are positioned with their hypotenuse faces in a common plane, with their triangular faces parallel with each other, and with each prism offset from each adjacent prism by a selected offset distance, measured in a first axis parallel with the hypotenuse faces and the triangular faces;

wherein each prism is also offset from each adjacent prism by the same selected offset distance, measured in a second axis normal to the triangular faces and perpendicular to the first axis, whereby the array is oriented at 45° to the first and second axes;

wherein the array is positioned to receive light from a linear array of beams directed along a third axis normal to the hypotenuse faces and perpendicular to the first and second axes, whereby each beam is reflected from one of the prisms and, because of the orientation of the prisms, emerges with its cross-sectional shape rotated by 90°; and wherein the prisms are positioned with the triangular faces of adjacent prisms in overlapping contact, and the offset of each prism measured in the second axis is equal to the thickness of each prism measured between its triangular faces.

2. An optical prism structure as defined in claim 1, wherein the offset distance measured in the first axis is also equal to the thickness of each prism.

3. An optical prism structure for reformatting an output from a laser diode bar, which produces a linear array of output beams, wherein the reformatting of the output effects an interchange of lateral and transverse beam properties, the prism structure comprising:

an array of optical roof prisms, each of the prisms in the array having two opposed triangular faces, a hypotenuse face and two angled faces adjoining the hypotenuse face and adjoining each other at a prism roof angle of approximately 90°;

an additional roof prism, having a length approximately co-extensive with the array of prisms, and positioned to receive light beams reflected from the array of prisms and to reflect the received beams along parallel but oppositely directed beams paths;

wherein the prisms in the array are positioned with their hypotenuse faces in a common plane, with their triangular faces parallel with each other, and with each prism offset from each adjacent prism by a selected offset distance, measured in a first axis parallel with the hypotenuse faces and the triangular faces;

wherein each prism is also offset from each adjacent prism by the same selected offset distance, measured in a second axis normal to the triangular faces and perpendicular to the first axis, whereby the array is oriented at 45° to the first and second axes; and wherein the array is positioned to receive light from a linear array of beams directed along a third axis normal to the hypotenuse faces and perpendicular to the first and second axes, whereby each beam is reflected from one of the prisms and, because of the orientation of the prisms, emerges with its cross-sectional shape rotated by 90°.

4. A laser array light source, comprising:

a laser diode bar providing a linear array of N output beams arrayed parallel to a selected direction, the beams having cross-sectional shapes that are elongated in the selected direction;

an array of N optical roof prisms, having parallel triangular faces and hypotenuse faces positioned to receive the respective output beams;

wherein the roof prisms are oriented with their triangular faces at 45° to the selected direction, with each prism offset from its nearest neighboring prism by an offset distance selected to position each prism to receive an output beam;

and wherein each beam is reflected through a corresponding one of the roof prisms and emerges oppositely directed with respect to the original output beams, and with its cross-sectional shape rotated by 90°, such that each reflected beam has its cross-sectional shape elongated in a direction perpendicular to the selected direction, to provide a composite beam array that is more symmetrical than the original output beam array.

5. A laser array light source as defined in claim 4, wherein adjacent prisms in the array have their adjacent triangular faces in overlapping contact, and the offset distance is equal to the thickness of each prism measured between its triangular faces.

6. A laser array light source as defined in claim 4, and further comprising:

a single retro prism, having a length approximately co-extensive with the array of roof prisms, and positioned to receive the beams reflected from the array and to reflect the beams through 180° to provide an output array of beams in a direction away from the laser diode bar, thereby minimizing the proximity of the output array of beams to the laser diode bar and any ancillary equipment.

7. An optical prism structure for reformatting an output from a laser diode bar, which produces an linear array of output beams with cross-sectional shapes that are elongated in the same direction as the linear array, the prism structure comprising:

an array of optical roof prisms, each of the prisms in the array having two opposed triangular faces, a hypotenuse face and two angled faces adjoining the hypotenuse face and adjoining each other to form a prism roof angle;

wherein the prisms in the array are positioned with common features arrayed along a selected axis;

wherein the prisms in the array are positioned with the triangular faces of adjacent prisms in overlapping contact, and with each prism offset from its closest adjacent prism by an offset distance equal to the thickness of each prism, to produce an array in which each prism is oriented at 45° to the selected axis;

and wherein the array is positioned to receive light from a plurality of beams arrayed along the selected axis and directed normal to the hypotenuse faces of the prisms, whereby each beam is reflected from one of the prisms and, as a result of the orientation of the prisms, emerges with its cross-sectional shape rotated by 90°.

8. An optical prism structure as defined in claim 7, and further comprising:

an additional roof prism, having a length approximately co-extensive with the array of prisms measured along the selected axis, and positioned to receive light beams reflected from the array of prisms and to reflect the received beams as a set of parallel but oppositely directed beams.

* * * * *